(12) United States Patent
Shekhar et al.

(10) Patent No.: US 12,547,973 B1
(45) Date of Patent: *Feb. 10, 2026

(54) SYSTEM AND METHOD OF VARIABLE-FIXING DECOMPOSITION OF SUPPLY CHAIN PLANNING PROBLEMS

(71) Applicant: Blue Yonder Group, Inc., Scottsdale, AZ (US)

(72) Inventors: Tushar Shekhar, Bangalore (IN); Narayan Nandeda, Ujjain (IN); Arijit Deb, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 429 days.

This patent is subject to a terminal disclaimer.

(21) Appl. No.: 17/188,417

(22) Filed: Mar. 1, 2021

Related U.S. Application Data

(60) Provisional application No. 62/983,969, filed on Mar. 2, 2020.

(51) Int. Cl.
*G06Q 10/087* (2023.01)
*G06Q 10/04* (2023.01)

(52) U.S. Cl.
CPC .......... *G06Q 10/087* (2013.01); *G06Q 10/04* (2013.01)

(58) Field of Classification Search
CPC .............................. G06Q 10/087; G06Q 10/04

USPC ...................................................... 705/11.7
See application file for complete search history.

(56) References Cited

U.S. PATENT DOCUMENTS

2005/0171826 A1 * 8/2005 Denton ................ G06Q 10/063
705/7.11

FOREIGN PATENT DOCUMENTS

WO WO-2013019577 A2 * 12/2013 ............. G06F 17/30
WO WO-2020038902 A1 * 2/2020 ............. G06F 30/00

* cited by examiner

*Primary Examiner* — Luna Champagne
(74) *Attorney, Agent, or Firm* — Spencer Fane LLP; Steven J. Laureanti

(57) ABSTRACT

A system and method are disclosed including a computer that receives a formulation of a multi-objective linear programming planning problem, the formulation including at least one variable fixed at an upper bound or a lower bound. The computer also solves the formulation for a higher-order objective and fixes the upper bound or the lower bound of at least one variable to preserve a solution of the formulation for the higher-order objective. The computer also replaces at least one variable in the formulation with a value of the upper bound or the lower bound, when the upper bound of at least one variable is fixed at the lower bound or the lower bound of at least one variable is fixed at the upper bound, and checks whether replacing at least one variable with the value of the upper bound or the lower bound divides the formulation into two independent components.

20 Claims, 8 Drawing Sheets

SYSTEM AND METHOD OF VARIABLE-FIXING DECOMPOSITION OF SUPPLY CHAIN PLANNING PROBLEMS

CROSS-REFERENCE TO RELATED APPLICATIONS

The present disclosure is related to that disclosed in the U.S. Provisional Application No. 62/983,969, filed Mar. 2, 2020, entitled "System and Method of Variable-Fixing Decomposition of Supply Chain Planning Problems." U.S. Provisional Application No. 62/983,969 is assigned to the assignee of the present application. The present invention hereby claims priority under 35 U.S.C. § 119(e) to U.S. Provisional Application No. 62/983,969.

TECHNICAL FIELD

The present disclosure relates generally to supply chain planning and specifically to systems and methods of solving linear programming supply chain planning problems using variable-fixing decomposition.

BACKGROUND

During supply chain planning, a supply chain plan may be generated by solving a supply chain planning problem modeled as a single- or multi-objective linear programming problem (LPP). For example, a supply chain planner may model a master production problem as a multi-objective hierarchical LPP. However, the efficiency and accuracy may be outweighed by increases in solve time and complexity resulting from the monolithic LP formulation of the multi-objective LP supply chain planning problem. Unfortunately, monolithic LP problems are generally not amenable to standard decomposition techniques, which often bring improved solving speed. The inability to improve solving speed by decomposing multi-period supply chain planning problems is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
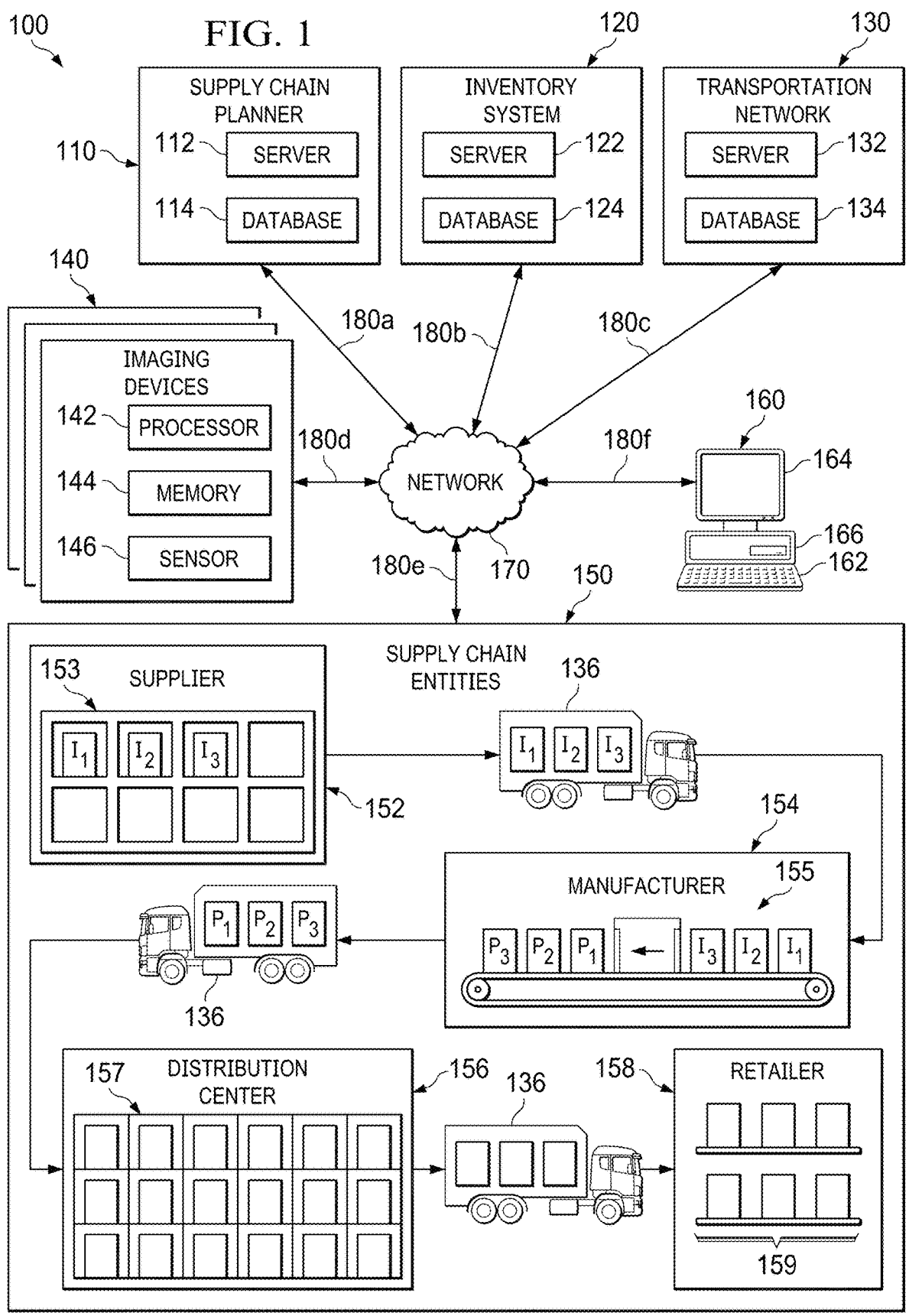
FIG. 1 illustrates a supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, according to a first embodiment. Supply chain network 100 comprises supply chain planner 110, inventory system 120, transportation network 130, one or more imaging devices 140, one or more supply chain entities 150, one or more computers 160, network 170, and communication links 180a-180f. Although a single supply chain planner 110, a single inventory system 120, a single transportation network 130, one or more imaging devices 140, one or more supply chain entities 150, one or more computers 160, and a single network 170 are shown and described, embodiments contemplate any number of supply chain planners, inventory systems, transportation networks, imaging devices, supply chain entities, computers, or networks, according to particular needs.

In one embodiment, supply chain planner 110 comprises server 112 and database 114. Server 112 comprises one or more modules that model, decompose, and solve a supply chain planning problem by utilizing variable-fixing between objective solves to identify divisions for decomposing the supply chain planning problem into two or more subproblems. One factor that prevents decomposing large and complicated supply chain planning problems is one or more variables subject to at least two constraints, which prevents dividing a problem where the variable overlaps the division between subproblems. To overcome this problem, supply chain planner 110 begins solving formulations of the Linear Programming (LP) supply chain planning problem for each objective in a hierarchy of objectives and fixing variables to preserve the optimality of higher-order objectives, until detecting at least one variable fixed to the same value for both its upper and lower bound. In response to detecting one or more variables fixed to the same value for its upper and lower bound, supply chain planner 110 attempts to decompose the LP supply chain planning problem by removing the fixed variables in subsequent LP solves and replacing them with their fixed values.

Inventory system 120 comprises server 122 and database 124. Server 122 of inventory system 120 is configured to receive and transmit product data 210 (FIG. 2) (including, for example, item identifiers, pricing data, and attribute data), inventory data 214 (including, for example, inventory levels), and other like data about one or more items at one or more locations in supply chain network 100. Server 122 stores and retrieves data about one or more items from database 124 or from one or more locations in supply chain network 100.

Transportation network 130 comprises server 132 and database 134. According to embodiments, transportation network 130 directs one or more transportation vehicles 136 to ship one or more items between one or more supply chain entities 150, based, at least in part, on the number of items currently in transit in transportation network 130, a supply chain plan, including a master supply chain plan, the number of items currently in stock at one or more supply chain entities 150, a forecasted demand, a supply chain disruption, a material or capacity reallocation, current and projected inventory levels at one or more stocking locations, and/or one or more additional factors described herein. One or more transportation vehicles comprise, for example, any number of trucks, cars, vans, boats, airplanes, unmanned aerial vehicles (UAVs), cranes, robotic machinery, or the like. One or more transportation vehicles 136 may comprise radio, satellite, or other communication that communicates location information (such as, for example, geographic coordinates, distance from a location, global positioning satellite (GPS) information, or the like) with supply chain planner 110, inventory system 120, transportation network 130, one or more imaging devices 140, and/or one or more supply chain entities 150 to identify the location of one or more transportation vehicles 136 and the location of an item of any inventory or shipment located on one or more transportation vehicles 136.

One or more imaging devices 140 comprise one or more processors 142, memory 144, one or more sensors 146, and may include any suitable input device, output device, fixed or removable computer-readable storage media, or the like. According to embodiments, one or more imaging devices 140 comprise an electronic device that receives data from one or more sensors 146 or from one or more databases in supply chain network 100. One or more sensors 146 of one or more imaging devices 140 may comprise an imaging sensor, such as, a camera, scanner, electronic eye, photodiode, charged coupled device (CCD), or any other electronic component that detects visual characteristics (such as color, shape, size, fill level, or the like) of objects. One or more imaging devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases.

In addition, or as an alternative, one or more sensors 146 may comprise a radio receiver and/or transmitter configured to read from and/or write to an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like device that encodes identifying information. One or more imaging devices 140 may generate a mapping of one or more items in supply chain network 100 by scanning an identifier or device associated with an item and identifying the item based, at least in part, on the scan. This may include, for example, a stationary scanner located at one or more supply chain entities 150 that scans items as the items pass near the scanner. As explained in more detail below, supply chain planner 110, inventory system 120, transportation network 130, and one or more imaging devices 140 may use the mapping of an item to locate the item in supply chain network 100. The location of the item may be used to coordinate the storage and transportation of items in supply chain network 100 according to one or more plans generated by supply chain planner 110 and/or a reallocation of materials or capacity. Plans may comprise one or more of a master supply chain plan, production plan, distribution plan, and the like. Additionally, one or more sensors 146 of one or more imaging devices 140 may be located at one or more locations local to, or remote from, one or more imaging devices 140, including, for example, one or more sensors 146 integrated into one or more imaging devices 140 or one or more sensors 146 remotely located from, but communicatively coupled with, one or more imaging devices 140. According to some embodiments, one or more sensors 146 may be configured to communicate directly or indirectly with one or more of supply chain planner 110, inventory system 120, transportation network 130, one or more imaging devices 140, one or more supply chain entities 150, one or more computers 160, and/or network 170 using one or more communication links 180a-180f.

As shown in FIG. 1, supply chain network 100 comprising supply chain planner 110, inventory system 120, transportation network 130, one or more imaging devices 140, and one or more supply chain entities 150 may operate on one or more computers 160 that are integral to or separate from the hardware and/or software that support supply chain planner 110, inventory system 120, transportation network 130, one or more imaging devices 140, and one or more supply chain entities 150. One or more computers 160 may include any suitable input device 162, such as a keypad, mouse, touch screen, microphone, or other device to input information. An output device 164 may convey information associated with the operation of supply chain network 100, including digital or analog data, visual information, or audio information. One or more computers 160 may include fixed or removable computer-readable storage media, including a non-transitory computer readable medium, magnetic computer disks, flash drives, CD-ROM, in-memory device or other suitable media to receive output from and provide input to supply chain network 100. One or more computers 160 may include one or more processors 166 and associated memory to execute instructions and manipulate information according to the operation of supply chain network 100 and any of the methods described herein. In addition, or as an alternative, embodiments contemplate executing the instructions on one or more computers 160 that cause one or more computers 160 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein. By way of example only and not of limitation, further embodiments include any number of one or more processing units, including, for example, one or more graphical processing units (GPUs), programmed to create, manipulate, render for display, analyze, decompose, or otherwise process one or more graphs, networks, digraphs, multigraphs, images, or other data structures, according to particular needs.

Supply chain planner 110, inventory system 120, transportation network 130, one or more imaging devices 140, and one or more supply chain entities 150 may each operate on one or more separate computers, a network of one or more separate or collective computers, or may operate on one or more shared computers. In addition, supply chain network 100 may comprise a cloud-based computing system having processing and storage devices at one or more locations, local to, or remote from supply chain planner 110, inventory system 120, transportation network 130, one or more imaging devices 140, and one or more supply chain entities 150. In addition, each of one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with supply chain planner 110, inventory system 120, transportation network 130, one or more imaging devices 140, and one or more supply chain entities 150. These one or more users may include, for example, a "manager" or a "planner" handling supply chain planning and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, master supply chain planning, plan adjustment after supply chain disruptions, order placement, automated warehouse operations (including removing items from and placing items in inventory), robotic production machinery (including producing items), and/or one or more related tasks within supply chain network 100.

One or more supply chain entities 150 may represent one or more suppliers 152, manufacturers 154, distribution centers 156, and retailers 158 in one or more supply chain networks 100, including one or more enterprises. One or more suppliers 152 may be any suitable entity that offers to sell or otherwise provides one or more components to one or more manufacturers 154. One or more suppliers 152 may, for example, receive a product from a first supply chain entity in supply chain network 100 and provide the product to another supply chain entity. One or more suppliers 152 may comprise automated distribution systems 153 that automatically transport products to one or more manufacturers based, at least in part, on the number of items currently in transit in transportation network 130, a supply chain plan, including a master supply chain plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more manufacturers 154 may be any suitable entity that manufactures at least one product. One or more manufacturers 154 may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, an item that needs further processing, or any other item. One or more manufacturers 154 may, for example, produce and sell a product to a supplier, another manufacturer, a distribution center, a retailer, a customer, or any other suitable person or an entity. Such manufacturers 154 may comprise automated robotic production machinery 155 that produce products based, at least in part, on the number of items currently in transit in transportation network 130, a supply chain plan, including a master supply chain plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more distribution centers 156 may be any suitable entity that offers to sell or otherwise distributes at least one product to the one or more retailers, customers, or any suitable one or more supply chain entities 150. One or more distribution centers 156 may, for example, receive a product from a first supply chain entity in supply chain network 100 and store and transport the product for a second supply chain entity. One or more distribution centers 156 may comprise automated warehousing systems 157 that automatically transport an item to, remove an item from, or place an item into inventory of one or more retailers 158, customers, or one or more supply chain entities 150 based, at least in part, on the number of items currently in transit in transportation network 130, a supply chain plan, including a master supply chain plan, the number of items currently in stock at one or more supply chain entities 150, a forecasted demand, a supply chain disruption, a material or capacity reallocation, current and projected inventory levels at one or more stocking locations, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on the number of items currently in transit in transportation network 130, a supply chain plan, including a master supply chain plan, the number of items currently in stock at one or more supply chain entities 150, a forecasted demand, a supply chain disruption, a material or capacity reallocation, current and projected inventory levels at one or more stocking locations, and/or one or more additional factors described herein.

Although one or more suppliers 152, manufacturers 154, distribution centers 156, and retailers 158 are shown and described as separate and distinct entities, the same entity may simultaneously act as any one or more suppliers 152, manufacturers 154, distribution centers 156, and retailers 158. For example, one or more manufacturers 154 acting as a manufacturer could produce a product, and the same entity could act as one or more suppliers 152 to supply a product to another one or more supply chain entities 150. Although one example of a supply chain network 100 is shown and described, embodiments contemplate any configuration of supply chain network 100, without departing from the scope of the present disclosure.

In one embodiment, supply chain planner 110 may be coupled with network 170 using communications link 180a, which may be any wireline, wireless, or other link suitable to support data communications between supply chain planner 110 and network 170 during operation of supply chain network 100. Inventory system 120 may be coupled with network 170 using communications link 180b, which may be any wireline, wireless, or other link suitable to support data communications between inventory system 120 and network 170 during operation of supply chain network 100. Transportation network 130 may be coupled with network 170 using communications link 180c, which may be any wireline, wireless, or other link suitable to support data communications between transportation network 130 and network 170 during operation of supply chain network 100. One or more imaging devices 140 are coupled with network 170 using communications link 180d, which may be any wireline, wireless, or other link suitable to support data communications between one or more imaging devices 140 and network 170 during operation of distributed supply chain network 100. One or more supply chain entities 150 may be coupled with network 170 using communications link 180e, which may be any wireline, wireless, or other link suitable to support data communications between one or more supply chain entities 150 and network 170 during operation of supply chain network 100. One or more computers 160 may be coupled with network 170 using communications link 180f, which may be any wireline, wireless, or other link suitable to support data communications between one or more computers 160 and network 170 during operation of supply chain network 100. Although communication links 180a-180f are shown as generally coupling supply chain planner 110, inventory system 120, transportation network 130, one or more imaging devices 140, one or more supply chain entities 150, and one or more computers 160 to network 170, any of supply chain planner 110, inventory system 120, transportation network 130, one or more imaging devices 140, one or more supply chain entities 150, and one or more computers 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation network 130, one or more imaging devices 140, one or more supply chain entities 150, and one or more computer 160. For example, data may be maintained by locally or externally of supply chain planner 110, inventory system 120, transportation network 130, one or more imaging devices 140, one or more supply chain entities 150, and one or more computer 160 and made available to one or more associated users of supply chain planner 110, inventory system 120, transportation network 130, one or more imaging devices 140, one or more supply chain entities 150, and one or more computer 160 using network 170 or in any other appropriate manner. For example, data may be maintained in a cloud database at one or more locations external to supply chain planner 110, inventory system 120, transportation network 130, one or more imaging devices 140, one or more supply chain entities 150, and one or more computer 160 and made available to one or more associated users of supply chain planner 110, inventory system 120, transportation network 130, one or more imaging devices 140, one or more supply chain entities 150, and one or more computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, supply chain planner 110 may generate a supply chain plan, including a master supply chain plan. Furthermore, one or more computers 160 associated with supply chain network 100 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on the number of items currently in transit in transportation network 130, a supply chain plan, including a master supply chain plan, a solution to a supply chain planning problem, the number of items currently in stock at one or more supply chain entities 150, a forecasted demand, a supply chain disruption, a material or capacity reallocation, current and projected inventory levels at one or more stocking locations, and/or one or more additional factors described herein. For example, the methods described herein may include one or more computers 160 receiving product data 210 from automated machinery having at least one sensor and product data 210 corresponding to an item detected by the automated machinery. The received product data may include an image of the item, an identifier, as described above, and/or product information associated with the item, including, for example, dimensions, texture, estimated weight, and the like. One or more computers 160 may also receive, from one or more sensors 146 of one or more imaging devices 140, a current location of the identified item.

The methods may further include one or more computers 160 looking up the received product data in the database system associated with supply chain planner 110 to identify the item corresponding to product data 210 received from automated machinery. Based on the identification of the item, one or more computers 160 may also identify (or alternatively generate) a first mapping in the database system, where the first mapping is associated with the current location of the identified item. One or more computers 160 may also identify a second mapping in the database system, where the second mapping is associated with a past location of the identified item. One or more computers 160 may also compare the first mapping and the second mapping to determine if the current location of the identified item in the first mapping is different than the past location of the identified item in the second mapping. One or more computers 160 may then send instructions to the automated machinery based, as least in part, on one or more differences between the first mapping and the second mapping such as, for example, to locate items to add to or remove from an inventory of or shipment for one or more supply chain entities 150. In addition, or as an alternative, supply chain planner 110 monitors one or more supply chain constraints of one or more items at one or more supply chain entities 150 and adjusts the orders and/or inventory of one or more supply chain entities 150 at least partially based on one or more supply chain constraints.

Figure 2:
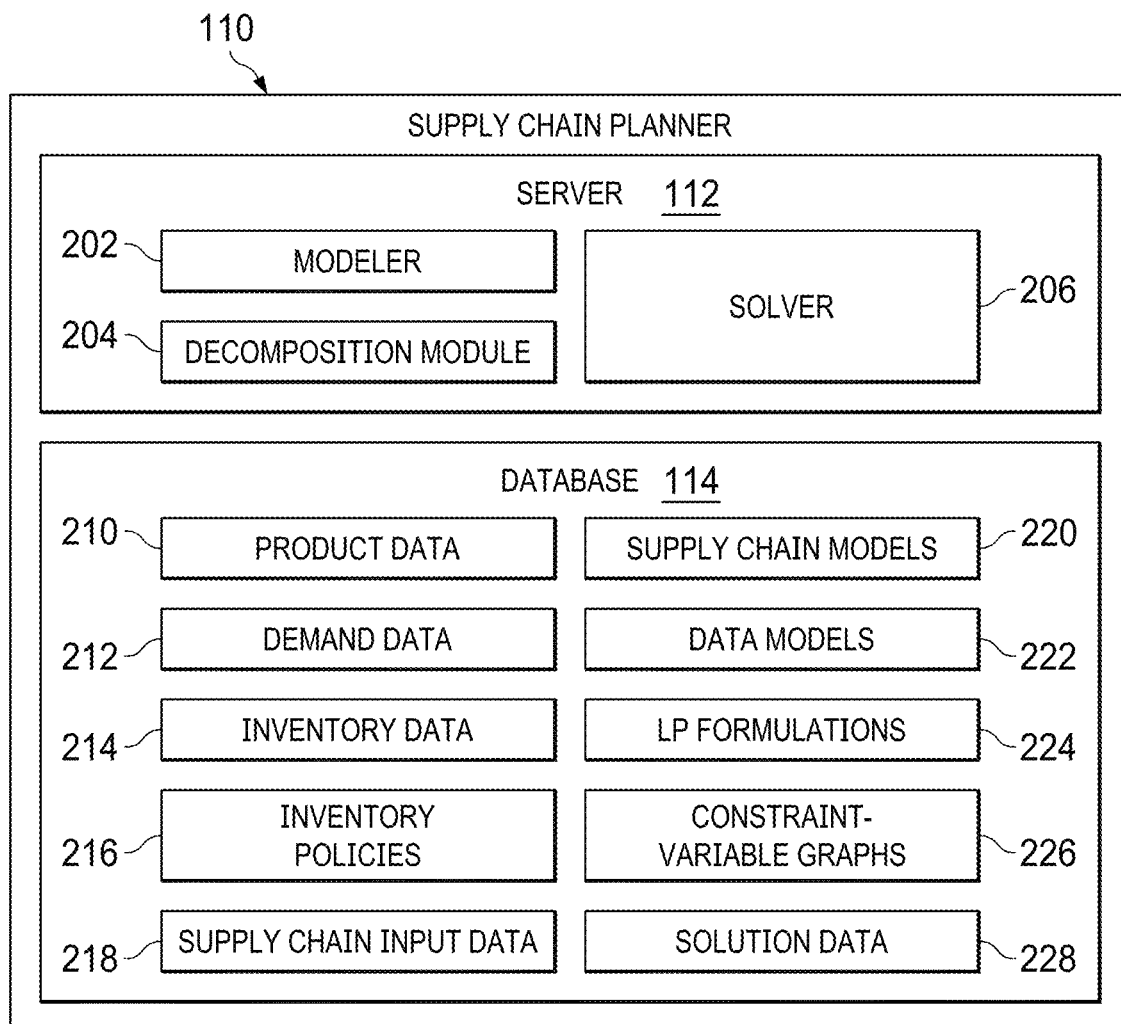
FIG. 2 illustrates the supply chain planner of FIG. 1 in greater detail, according to an embodiment.

FIG. 2 illustrates supply chain planner 110 of FIG. 1 in greater detail, according to the first embodiment. As discussed above, supply chain planner 110 may comprise server 112 and database 114. Although supply chain planner 110 is shown as comprising a single server 112 and a single database 114, embodiments contemplate any suitable number of servers or databases internal to or externally coupled with supply chain planner 110.

Server 112 of supply chain planner 110 may comprise modeler 202, decomposition module 204, and solver 206. Although server 112 is shown and described as comprising a single modeler 202, a single decomposition module 204, and a single solver 206, embodiments contemplate any suitable number or combination of these located at one or more locations, local to, or remote from supply chain planner 110, such as on multiple servers or computers at any location in supply chain network 100.

Database 114 of supply chain planner 110 may comprise one or more databases or other data storage arrangement at one or more locations, local to, or remote from, server 112. Database 114 comprises, for example, product data 210, demand data 212, inventory data 214, inventory policies 216, supply chain input data 218, supply chain models 220, data models 222, LP formulations 224, constraint-variable graphs 226, and solution data 228. Although database 114 is shown and described as comprising product data 210, demand data 212, inventory data 214, inventory policies 216, supply chain input data 218, supply chain models 220, data models 222, LP formulations 224, constraint-variable graphs 226, and solution data 228, embodiments contemplate any suitable number or combination of these, located at one or more locations, local to, or remote from, supply chain planner 110 according to particular needs.

Modeler 202 may model one or more supply chain planning problems, such as a master planning problem, for supply chain network 100. In one embodiment, modeler 202 of server 112 models a supply chain planning problem as a multi-objective hierarchical LP supply chain planning problem. In addition, or as an alternative, modeler 202 of server 112 models a supply chain planning problem as constraint-variable graphs 226, a network of nodes and edges, one or more matrices (including, for example, a constraint-variable matrix), or other suitable models and LP formulations 224, according to particular needs. Although modeler 202 is described as modeling supply chain planning problems as multi-objective hierarchical LP supply chain planning problems, constraint-variable graphs 226, matrices, LP formulations 224, and the like, embodiments contemplate modeler 202 generating other mathematical and graphical models of supply chain planning problems, according to particular needs.

Decomposition module 204 of server 112 checks LP formulations 224 for decomposition. According to embodiments, decomposition module 204 searches LP formulations 224 for independent, completely disjoint problems, such that LP formulations 224 (such as, for example, a matrix) may be decomposed into two or more subproblems (such as, for example, two or more submatrices). Decomposition module 204 then makes a call to solver 206 to solve each of the decomposed subproblems in parallel.

Solver 206 of server 112 comprises one or more optimization, heuristic, or mathematical solvers that utilize variable fixing during solves of multi-objective hierarchical LP supply chain planning problems. After variable fixing, decomposition module 204 checks whether the upper bound of a variable is set to its lower bound or whether the lower bound of a variable is set to its upper bound. When decomposition module 204 determines the lower bound is equal to the upper bound (or vice versa), modeler 202 removes the fixed variable from the LP supply chain planning problem and replaces it with the actual value (the fixed value). After replacing the fixed variables, decomposition module 204 attempts to decompose the LP supply chain planning problem at a division created by the removal of the variable from one or more constraints. Supply chain planner 110 checks for independent components before making a call to solver 206 and creates separate subproblems (such as, for example, LP formulations 224) for each independent component. At a further activity, solver 206 combines the solution of each of the independent subproblems to generate the globally optimal LP solution. As described in further detail below, solver 206 generates LP optimal solutions to multi-objective hierarchical LP supply chain planning problems after decomposition module 204 decomposes the problem into multiple subproblems which are divided by identifying variables fixed to a particular value and removing the variable from all lower-priority objectives.

Product data 210 of database 114 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 210 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Demand data 212 of database 114 may comprise, for example, any data relating to past sales, past demand, purchase data, promotions, events, or the like of one or more supply chain entities 150. Demand data 212 may cover a time interval such as, for example, by the minute, hour, daily, weekly, monthly, quarterly, yearly, or any suitable time interval, including substantially in real time. According to embodiments, demand data 212 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 214 of database 114 may comprise any data relating to current or projected inventory quantities or states, order rules, or the like. For example, inventory data 214 may comprise the current level of inventory for each item at one or more stocking locations across supply chain network 100. In addition, inventory data 214 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 214 in database 114, which may be used by supply chain planner 110 to place orders, set inventory levels at one or more stocking points, initiate manufacturing of one or more items (or components of one or more items), or the like. In addition, or as an alternative, inventory data 214 may be updated by receiving current item quantities, mappings, or locations from inventory system 120, transportation network 130, one or more imaging devices 140, and/or one or more supply chain entities 150.

Inventory policies 216 of database 114 may comprise any suitable inventory policy describing the reorder point and target quantity, or other inventory policy parameters that set rules for supply chain planner 110 to manage and reorder inventory. Inventory policies 216 may be based on target service level, demand, cost, fill rate, or the like. According to embodiments, inventory policies 216 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although, a particular target service level and percentage is described; embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicates to one or more supply chain entities 150 to transport or receive inventory to replace the depleted inventory based, at least in part, on the supply chain plan.

Supply chain input data 218 may comprise various decision variables, business constraints, goals, and objectives of one or more supply chain entities 150. According to some embodiments, supply chain input data 218 may comprise hierarchical objectives specified by, for example, business rules, master planning requirements, scheduling constraints, and discrete constraints, including, for example, sequence-dependent setup times, lot-sizing, storage, shelf life, and the like.

Supply chain models 220 of database 114 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). In addition, or as an alternative, supply chain models 220 may comprise characteristics that specify the supply chain structure in even more detail, including, for example, specifying the type of collaboration with the customer (e.g. Vendor-Managed Inventory (VMI)), from which stocking locations or suppliers items may be sourced, customer priorities, demand priorities, how products may be allocated, shipped, or paid for, by particular customers, and the destination stocking locations or one or more supply chain entities 150 where items may be transported. Each of these characteristics may lead to different supply chain models 220.

As an example only and not by way of limitation, database 114 stores data models 222, which represent the flow of materials through one or more supply chain entities 150 of supply chain network 100. Modeler 202 of supply chain planner 110 may model the flow of materials through one or more supply chain entities 150 of supply chain network 100 as one or more data models 222, comprising material storage and/or transition, which may be referred to as buffers. Buffers may represent item buffers (such as, for example, a raw material, intermediate good, finished good, component, and the like), resource buffers, or operations (including, for example, a production operation, assembly operation, transportation operation, and the like). Modeler 202 connects the buffers by modeling various transportation or manufacturing processes. Each connection may represent the flow, transportation, or assembly of materials (such as items or resources) between the buffers by, for example, production processing or transportation. According to some embodiments, one or more of the connections comprise weight representing the quantity of consumption and production.

LP formulations 224 of database 114 include single- or multi-objective LP supply chain planning problems, matrix formulations of the LP supply chain planning problem, and decomposed subproblems as well as any associated data and mappings used to formulate or solve an LP supply chain planning problem, such as, for example, an LP constraint-variable matrix, decomposed subproblems, globally-optimal LP solutions, objectives, objective hierarchies, and fixed variables. According to embodiments, LP formulations 224 comprise mathematical objective functions that represent business objectives, such as, for example, minimizing the quantity of unmet demand, minimizing usage of alternate resources (e.g. maximizing usage of primary resources), planning items as just-in-time (JIT) as possible (e.g. minimizing the amount of carried-over items), and the like. LP formulations 224 additionally comprise mathematical constraints representing limitations to capacity, materials, lead times, and the like; and minimum and maximum values for decision variables representing lower and upper bounds. By way of example only and not by way of limitation, the lower and upper bounds for the capacity of a machine may be set at zero hours and ten hours, respectively. In this example, zero hours comprises the lower bound (because a machine cannot be used for a negative period of time) and ten hours represents a maximum number of hours the machine may be used in a day.

As described in further detail below, constraint-variable graphs 226 comprise a grouping of constraint nodes (representing each constraint in the LP supply chain planning problem) linked to a grouping of variable nodes (representing each variable in the LP supply chain planning problem) by one or more edges. After solving for each of the multiple objectives (representing one or more business objectives), the final mathematical solution stored as solution data 228 of the multi-objective hierarchical LPP, when converted to a supply chain, represents an optimized supply chain plan. Initially, a supply chain planning problem may be converted into a multi-objective linear programming problem wherein the mathematical constraints, objectives, and bounds on variables of the supply chain planning problem is mapped to mathematical expressions in the multi-objective linear programming problem. After solving, the mapping of this conversion may be used to translate the solution of the multi-objective LPP to a supply chain plan.

Figure 3:
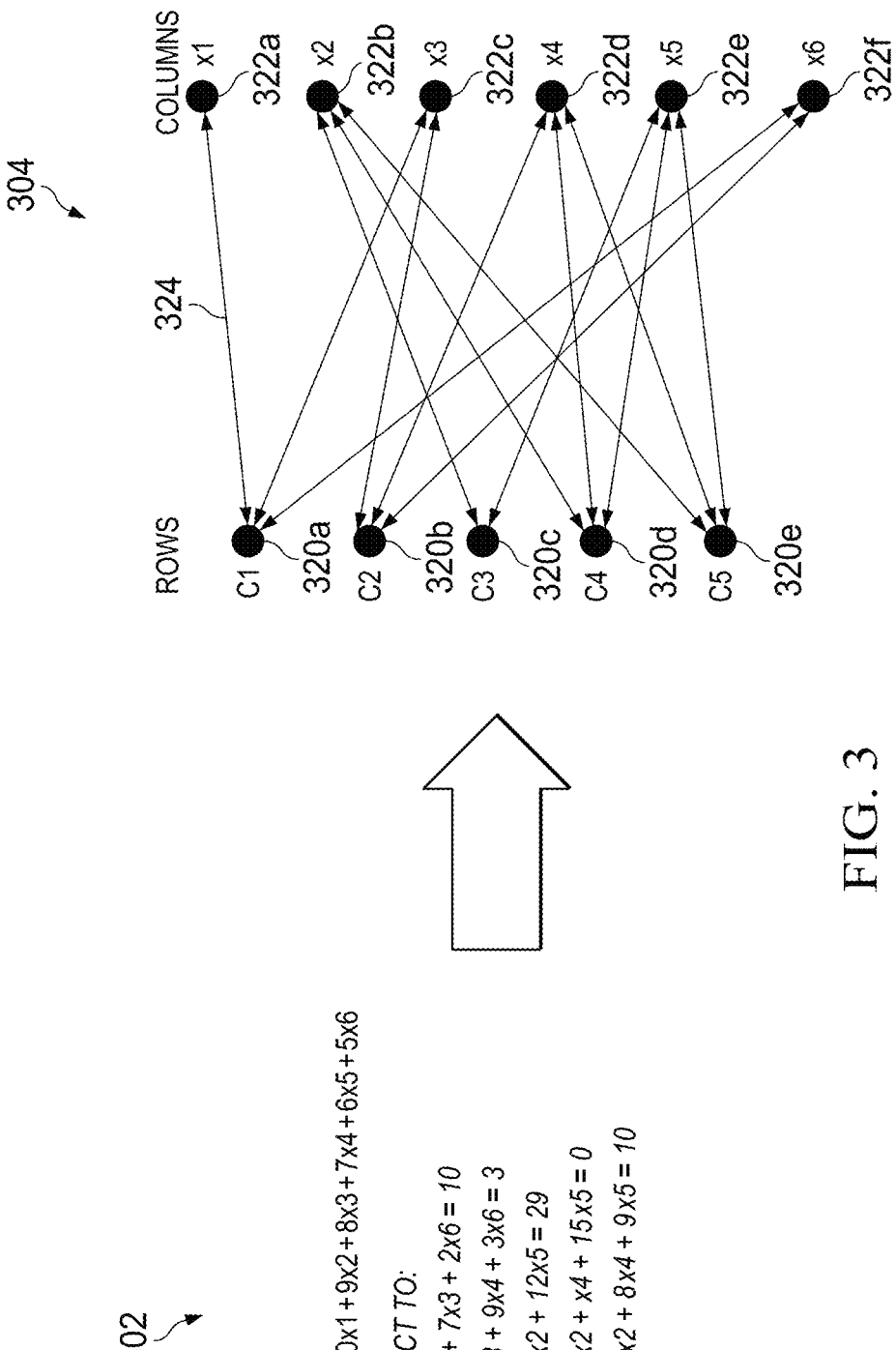
FIG. 3 illustrates a mathematical formulation of an example LP supply chain planning problem converted as a constraint-variable graph, according to an embodiment.

FIG. 3 illustrates mathematical formulation 302 of an example LP supply chain planning problem converted as a constraint-variable graph 304, according to an embodiment. Mathematical formulation 302 of a simple LP supply chain planning problem comprises a single objective function 310 (minimize: $10 \times 1 + 9 \times 2 + 8 \times 3 + 7 \times 4 + 6 \times 5 + 5 \times 6$) with six variables (x1-x6) and subject to five constraints 312a-312e (C1-C5). According to embodiments, constraints 312a-312e and variables of the LP supply chain planning problem are stored as one or more matrices, at least one of which comprises constraints 312a-312e and variables. In one embodiment of this constraint-variable matrix, each row represents a constraint and each column represents a variable. According to embodiment, LP formulations 224 of the LP supply chain planning problem comprises an LP constraint-variable matrix, which is a sparse matrix having constraints expressed by rows, variables represented by columns, and the intersection of the row constraint and column variable is the coefficient of that column's variable for that row's constraint. As described in further detail below, subproblems created by decomposing the LP supply chain planning problem are submatrices of LP constraint-variable matrix and which are also LP constraint-variable matrices. In addition, LP formulations 224 and/or any of the LP constraint-variable matrices may comprise one or more additional rows or columns in the same matrix, one or more other matrices, one or more submatrices, and the like, which may store other components associated with the LP supply chain planning problem, such as, for example, objectives, right-hand side (RHS) values, lower/upper bounds, and the like, according to particular needs. Although the LP supply chain planning problems are described as comprising one or more LP constraint-variable matrices, embodiments contemplate representing LP supply chain planning problems using other suitable mathematical forms, according to particular needs. According to embodiments, decomposition module 204 decomposes the LP supply chain planning problem into the subproblems by decomposing the LP constraint-variable matrix at a division created when solver 206 fixes the upper bound of a variable at its lower bound or fixes its lower bound at its upper bound. In addition, or as an alternative, decomposition module 204 decomposes the LP supply chain planning problem by decomposing the constraint-variable graph at a division created when the upper bound of a variable is fixed at its lower bound, or its lower bound is fixed at its upper bound.

Returning to FIG. 3, mathematical formulation 302 of the LP supply chain planning problem is converted to constraint-variable graph 304 that comprises a grouping of constraint nodes 320a-320e (representing each constraint in the LP supply chain planning problem) linked to a grouping of variable nodes 322a-322f (representing each variable in the LP supply chain planning problem) by edges 324. Edges 324 link each constraint node 320a-320e to one or more variable nodes 322a-322f according to constraints 312a-312e of the variable in the LP supply chain planning problem. To model the LP constraint-variable matrix (having constraint rows and variable columns) as constraint-variable graph 304, modeler 202 transforms each constraint row to a constraint node 320a-320e and each variable column to a variable node 322a-322f, and each non-zero intersection to an edge 324 coupling the constraint node 320a-320e of its row to variable node 322a-322f of its column. According to embodiments, five constraint nodes 320a-320e (representing the five constraints (C1-C5) are linked to variable nodes 322a-322f (representing the six variables (x1-x6)) in the same relationship that the constraints (e.g. C1-C5) restrict the variables (e.g. x1-x6).

In the illustrated embodiment, for example, constraint C1 is $x1+7 \times 3+2 \times 6=12$, and constraint C2 is $4 \times 3+9 \times 4+3 \times 6=3$. Constraint-variable graph 304 represents the three variables (i.e. x1, x3, and x6) restricted by the first constraint (C1) by linking C1 of constraint nodes 320a to x1 variable node 322a, x3 variable node 322c, and x6 variable node 322f. Similarly, the variables (i.e. x3, x4, and x6) restricted by the second constraint (C2) correspond to edges 324 connecting C2 constraint node 320b to x3 variable node 322c, x4 variable node 322d, and x6 variable node 322f.

As described in further detail below, when the LP supply chain planning problem is solved over multiple objectives, the upper and lower bounds of the variables are fixed to preserve the optimality of previously-solved objective functions. When fixing the upper and lower bounds for some variables (e.g. the fourth variable (x4)), the upper bound may become fixed to the previous lower bound for that variable, or the lower bound may become fixed to the previous upper bound. When the bound of a variable is fixed at the opposite bound, the variable is equal to that fixed value for all lower-order objectives that remain to be solved. Accordingly, decomposition module 204 sets the variable equal to the fixed value and checks whether replacing this variable by its fixed value in the LP supply chain planning problem creates one or more divisions at which the LP supply chain planning problem may be decomposed into two or more subproblems.

Figure 4:
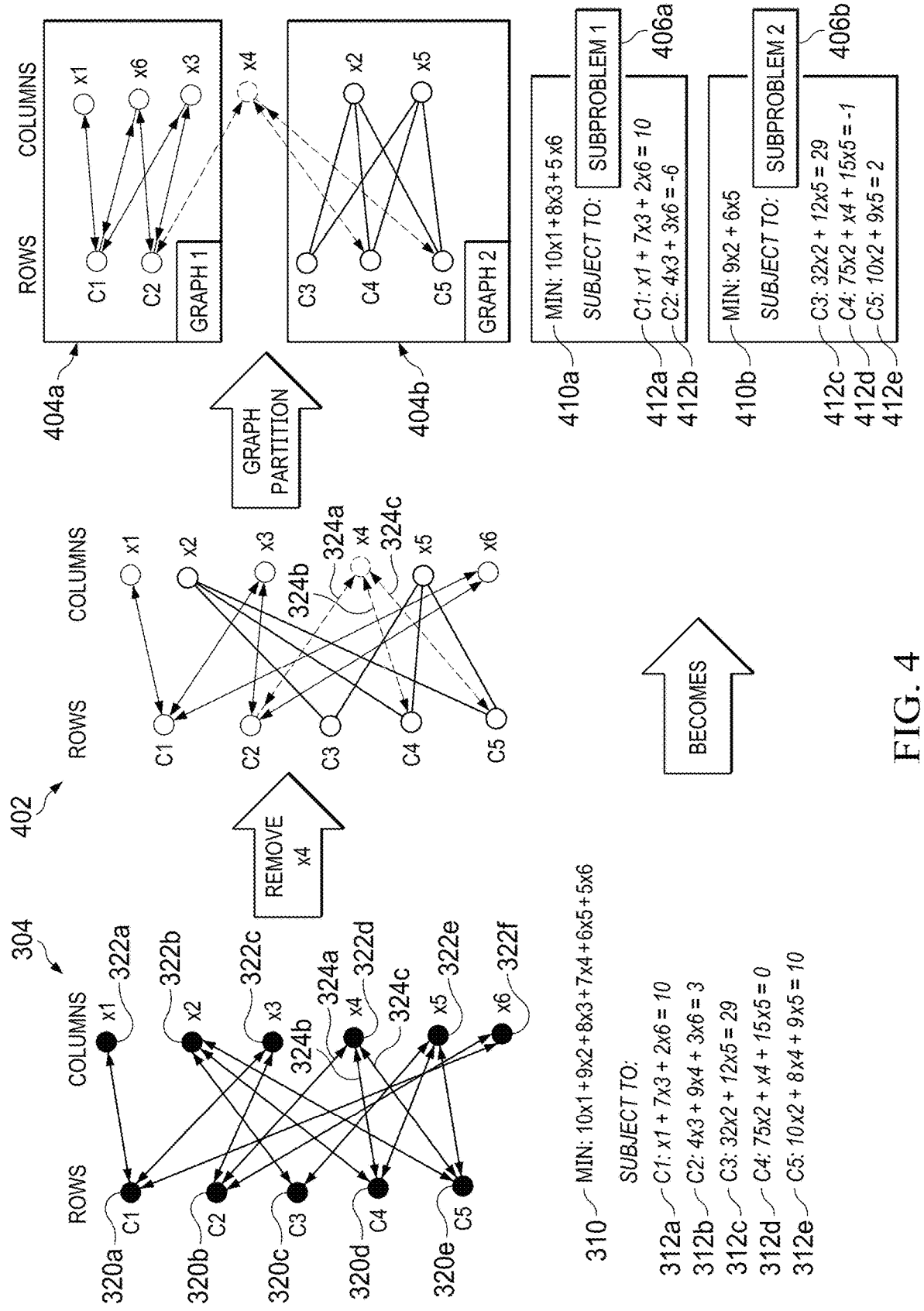
FIG. 4 illustrates decomposition of the LP supply chain planning problem of FIG. 3, according to an embodiment.

FIG. 4 illustrates decomposition of the LP supply chain planning problem of FIG. 3, according to an embodiment. The LP supply chain planning problem represented by the constraint-variable graph 304 is decomposed by removing edges 324a-324c linking the variable node 322d for the fourth variable (x4) with the constraint nodes for its constraints (C2-C5 320c-320e). After removing these edges 324a-324c, the resulting constraint-variable graph 402 is partitioned into two independent constraint-variable graphs, Graph 1 404a and Graph 2 404b. Mathematical formulation 310 and 312a-312e of the LP supply chain planning problem shows decomposition of the parent, or original, LP supply chain planning problem represented by constraint-variable graph 304 decomposed by solver 206 into Subproblem 1 406a and Subproblem 2 406b, represented by constraint-variable graphs, Graph 1 404a and Graph 2 404b. Subproblem 1 406a (and Graph 1 404a) has the first constraint (C1) 412a and the second constraint (C2) 412b which restrict the first variable (x1), the third variable (x3), and the sixth variable (x6) but which are transformed as necessary to remove the fourth variable (x4) (e.g. compare C2 312b with C2 412b). Subproblem 2 406b (and Graph 2 404b) has the third, fourth, and fifth constraints (C3-C5 412c-412e), which restrict the second and fifth variables (x2 and x5), but which are also transformed, as necessary to remove the fourth variable (x4) (e.g. compare C4 312d with C4 412d and C5 312e with C5 412e). After removing the fourth variable (x4), none of the variables are shared between subproblems 406a-406b, and these subproblems 406a-406b represent two completely independent components.

According to one embodiment, decomposition module 204 checks constraint-variable graph 304 for decomposition using Breadth-First Search (BFS) and/or Depth-First Search (DFS) to find disconnected components (e.g. a set of nodes which are disconnected from other nodes). Although the search techniques are described as BFS and/or DFS, embodiments contemplate other suitable searching techniques, according to particular needs. By way of example only and not of limitation, further embodiments include network 170X PYTHON library, NVIDIA® RAPIDS library (which may include, for example, processing constraint-variable graph 304 using one or more GPUs, to find connected components and independent components). Embodiments further contemplate other methods, libraries, processors, or techniques specifically configured to identify independent components, disconnected components, the structure of a connected network (such as, for example, identifying a set of connected or disconnected nodes), and the like.

Figure 5:
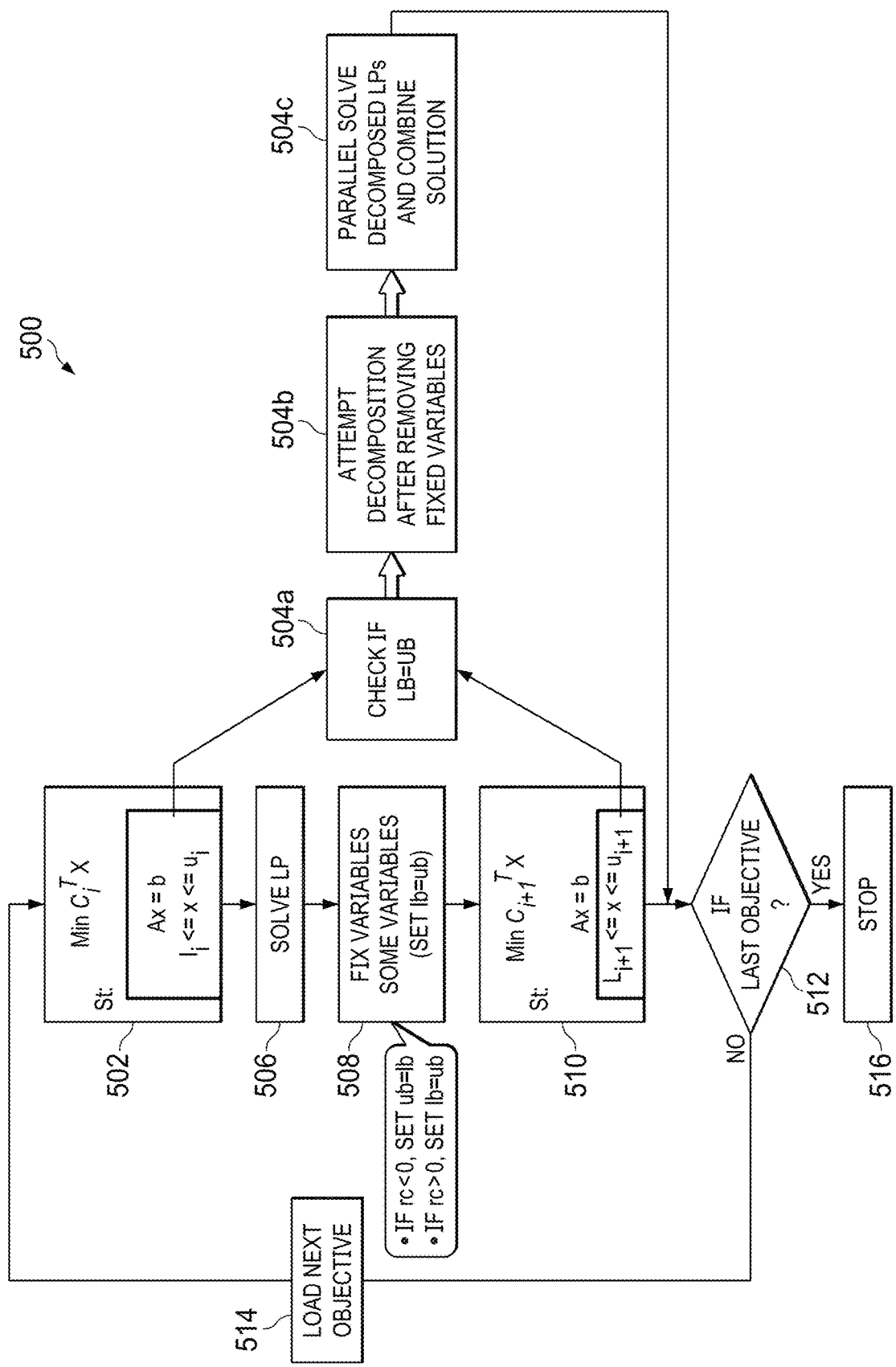
FIG. 5 illustrates a method of variable-fixing decomposition, according to an embodiment.

FIG. 5 illustrates method 500 of variable-fixing decomposition, according to an embodiment. Method 500 proceeds by one or more activities, which although described in a particular order, may be performed in one or more permutations, according to particular needs.

Method 500 begins at activity 502 when modeler 202 formulates a supply chain planning problem as a multi-objective hierarchical LP problem and formulates a first problem, which, in this example, is a minimization problem having constraints (Ax=B) and bounds (lower value is less than or equal to x, which is less than or equal to upper value. At activities 504a-504c, decomposition module 204 checks the formulated LP supply chain planning problem for decomposition prior to solving for the first objective. When the LP supply chain planning problem cannot be decomposed prior to solving for the first objective, decomposition module 204 continues to activity 506 and transmits the LP supply chain planning problem to solver 206, which receives and solves the LP supply chain planning problem for the first objective. At activity 508, solver 206 calculates the reduced cost and fixes variables at their upper or lower bounds to preserve the optimality of the solution for the first objective.

By way of further explanation only and not by way of limitation, an example is given wherein, after solving the first objective, solver 206 performs variable fixing using a reduced cost logic and fixes variables to their upper or lower bounds according to a stored list, which is further updated after each subsequent objective solve. According to embodiments, variables which can deteriorate an objective value are fixed at their lower bounds, variables which can improve an objective value are fixed at their upper bounds, and variables which are neutral remain unfixed. Upon solving the LP supply chain planning problem, solver 206 generates, as part of solution data 228, a reduced cost of each variable. In the case of a minimization objective, when a variable has a positive reduced cost (i.e. rc>0), then it will deteriorate the objective and hence be fixed to its lower bound, while a variable with a negative reduced cost (i.e. rc<0) will improve the objective value and hence be fixed to its upper bound.

Contemporaneously with, or subsequent to, solving the next objective at activity 510, decomposition module 204 checks again at activity 504a whether the upper bound of a variable is set to its lower bound or whether the lower bound of a variable is set to its upper bound. When decomposition module 204 detects that the lower bound is fixed to the upper bound (or vice versa), modeler 202 removes the fixed variable from the LP supply chain planning problem and replaces it with the actual value (the fixed value). After removing the fixed variables from the LP supply chain planning problem, supply chain planner 110 again checks the LP supply chain planning problem for decomposition at activity 504b. At activity 504c, for each independent component, solver 206 creates separate subproblems (such as, for example, LP formulations 224, as disclosed above). Supply chain planner 110 may call solver 206 and transmit the LP formulation for solving. Decomposition module 204 checks for independent, completely disjoint problems, such that the matrix may be decomposed into two or more subproblems. By way of example only and not by way of limitation, decomposition module 204 checks the LP supply chain planning problem modeled for the second objective for decomposition and identifies two independent components and returns two independent subproblems: subproblem 2.1 and subproblem 2.2. Decomposition module 204 calls to solver 206 to solve each of the decomposed subproblems in parallel. At activity 512, decomposition module 204 checks whether the current objective of the LP subproblems is the final objective. When solver 206 determines the current objective is not the final objective, method 500 continues to activity 514, loads the next objective, and returns to activity 502, where solver 206 accesses the objective formulation for the next objective, and solver 206 updates and iteratively solves the variable-fixing decomposed subproblems for the new objective.

Continuing with the previous example, activity 514 is described in connection with the previous example where decomposition module 204 identifies two independent components and returns two independent subproblems: subproblem 2.1 and subproblem 2.2. Modeler 202 may then update the objectives of these decomposed independent subproblems according to the second objective. If, for example, the second objective is $2x_1+3x_3+x_4$, and the constraints of independent subproblem 2.1 comprise variables $x_1$ and $x_3$ while the constraints of independent subproblem 2.2 comprise the variable $X_4$, then modeler 202 would model the objective of subproblem 2.1 as $2X_1+3X_3$ and the objective of subproblem problem 2.2 as $X_4$.

Solver 206 of supply chain planner 110 solves variable-fixing decomposed subproblems by iteratively loading and solving the decomposed subproblems for each objective in accordance with an order described by a hierarchy of the objectives, from an objective higher in the hierarchy (higher order or higher priority objective) to an objective lower in the hierarchy (lower order or lower priority objective). According to embodiments, the hierarchical order of the objectives indicates the order of importance of the objectives (such as, for example, the first objective is more important than the second objective; the second objective is more important than the third objective, etc.). When solving the variable-fixing decomposed subproblems for one or more lower objectives, solver 206 sets decision variables at their upper or lower bounds (which may be referred to as variable fixing) to retain the objective value of one or more higher objectives. To illustrate with the previous example, this activity may comprise decomposition module 204 calls solver 206, and solver 206 receives and solves both independent subproblems (e.g. subproblem 2.1 and subproblem 2.2) in parallel, followed by calculation of the reduced cost and variable fixing. Decomposition module 204 may then check for decomposition of the LP supply chain planning problem for a third objective. If for example, decomposition module 204 identifies two independent components for subproblem 2.1 (and returns two independent subproblems: subproblem 3.1 and subproblem 3.2) and identifies only a single independent component for subproblem 2.2 (and returns a single subproblem: subproblem 3.3), then modeler 202 updates the objectives of subproblems 3.1, 3.2, and 3.3 using the third objective to generate three subproblems for the third objective, while retaining only those variables in the objective which are part of the specific independent subproblems.

Modeler 202, decomposition module 204, and solver 206 of supply chain planner 110 continue to iteratively decompose, model, and solve the subproblems of the multi-objective hierarchical LP problem until reaching the final objective or one or more other stopping criteria. In response to detecting one or more stopping criteria, such as, for example, solving the last objective in the hierarchy of objectives at activity 512, solver 206 combines the solution of each of the independent subproblems to generate the globally optimal LP solution and method 500 ends at activity 516. In addition, although particular activities of the method are described as performed by modeler 202, decomposition module 204, or solver 206, embodiments contemplate using any of these or other suitable modules specifically configured to perform these activities, according to particular needs.

Figure 6:
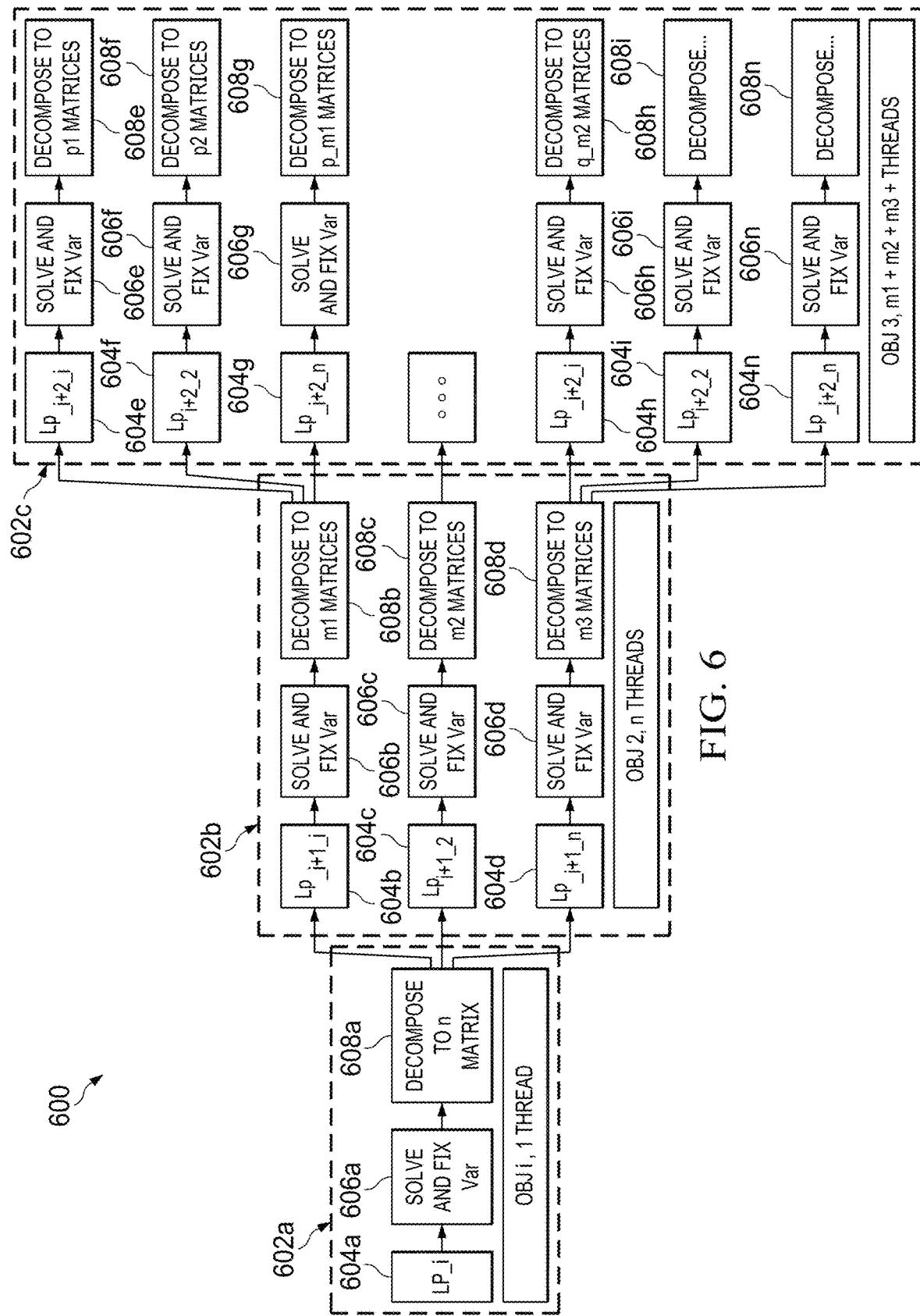
FIG. 6 illustrates a dataflow of the variable fixing decomposition method of FIG. 5, according to an embodiment.

FIG. 6 illustrates dataflow 600 of variable fixing decomposition method 500 of FIG. 5, according to an embodiment. Dataflow 600 begins at 602a with LP_i 604a, which comprises a single processor thread solving a single matrix, for the first objective function 606a, and is decomposed to n-sized matrix at 608a. At the second objective function 602b, decomposition module 204 divides the single constraint-variable matrix of first objective level 602a, Objective 1 (obj1) to n-number of parallel independent constraint-variable matrices 604b-604d, solved 606b-606d for the second objective level, Objective 2 (obj2) 602b. Next, the variables are updated and solver 206 searches for divisions to decompose the LP supply chain planning problem based on removing variables fixed at the same upper bound as its lower bound. In the illustrated embodiment, the N matrices 604b-604d (each matrix associated with a thread) of second objective 602b are decomposed into M1+M2+M3 matrices 608b-608d (each matrix associated with a thread) at the third objective level Objective 3 (obj3) 602c. When decomposition is not possible, the parallel threads illustrated (e.g. the three parallel threads 604b-604d, 606b-606d, and 608b-608d for obj2 602b and the more than six parallel threads 604e-604n, 606e-606n, and 608e-608n for obj3 602c) will have the same number of threads at the following objective level. The threads multiply, only when decomposition is possible.

Figure 7:
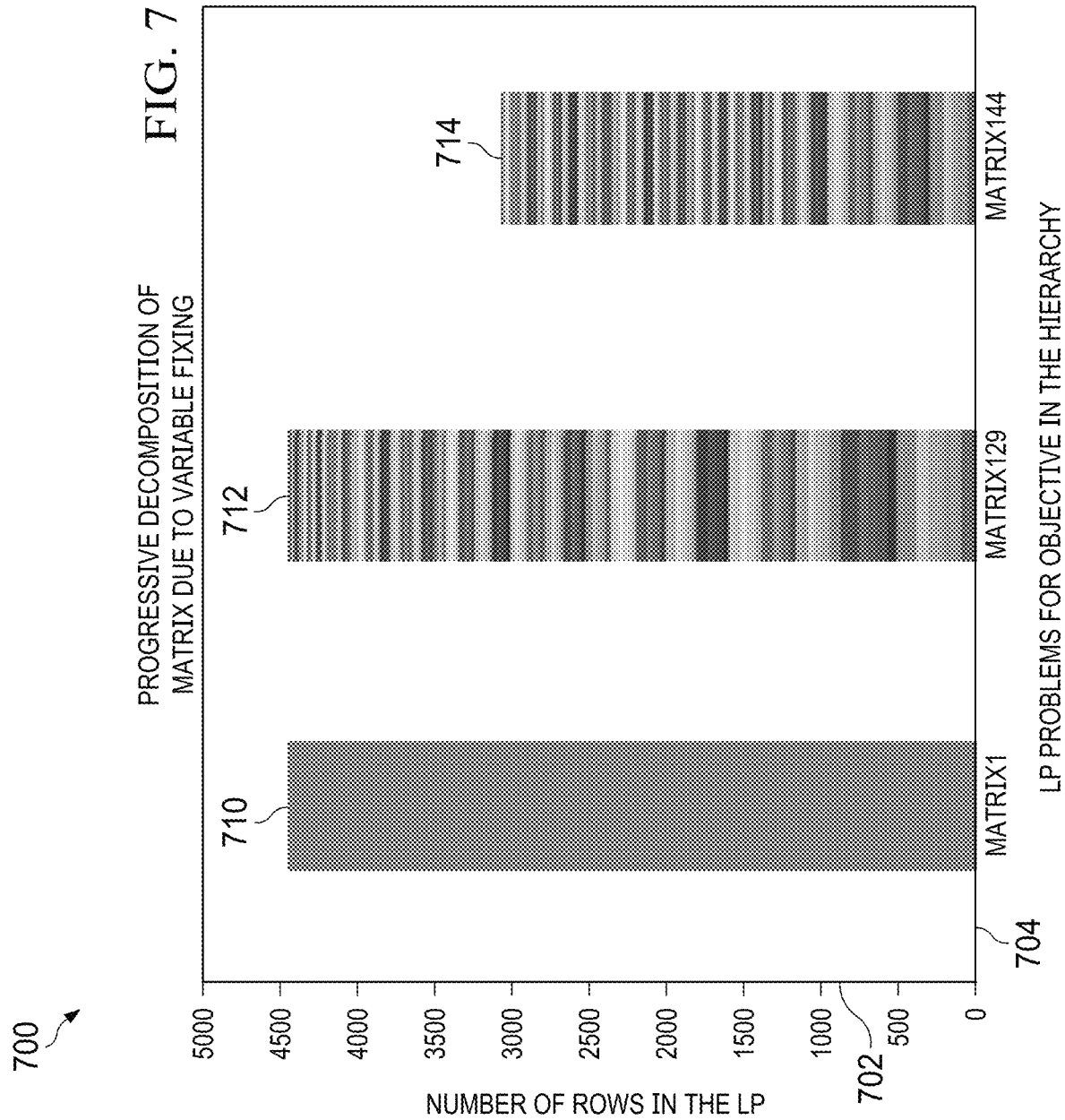
FIG. 7 illustrates a chart showing the number of rows of LP matrices progressively decomposed by the method of FIG. 5, according to an embodiment.

FIG. 7 illustrates chart 700 showing the number of rows of LP matrices progressively decomposed by method 500 of FIG. 5, according to an embodiment. Chart 700 shows the number of rows (y-axis 702) in the constraint-variable matrix of the LP supply chain planning problem at a particular objective of the hierarchy (x-axis 704). Matrix 1 710 is the constraint-variable matrix formulation of a monolithic LP supply chain planning problem having approximately 4500 rows, which, as disclosed above, represent constraints. Matrix 1 710 represents the matrix of the supply chain planning problem prior to solving for the first objective. Using the variable fixing method, the single matrix of Matrix 1 710 is decomposed into many independent subproblems at later objectives by iterations of solving, variable fixing, and decomposition. By the time supply chain planner 110 formulates the matrices representing the 129$^{th}$ objective, the monolithic Matrix 1 710, has decomposed into many different subproblems, represented by the variously-shaded bars of Matrix 129 712. Each of the shaded bars correspond to a smaller LP supply chain planning problem. Although these smaller LP supply chain planning problems retain the approximately 4500 constraints, each of these smaller LP supply chain planning problems may be solved in parallel. In addition, some of these smaller LP supply chain planning problems comprise only simple equations (such as, for example, a subproblem having 1, 2, or 3 equations). These subproblems may be solved by decomposition module 204 using a local processing unit, without making a separate call to solver 206. Matrix 144 714 represents the matrix at the 144$^{th}$ objective, after solving the smaller LP supply chain planning problems having only the simple equations. Solving the smaller LP supply chain planning problem eliminates approximately 1500 constraints, as shown by comparing Matrix 1 710 and Matrix 129 712. Although chart 700 shows decomposing a single LP supply chain planning problem with 4500 constraints into dozens of subproblems, the disclosed variable fixing decomposition method decomposes problems and subproblems of various sizes, including, for example, problems and subproblems having ten independent components, fifteen independent components, 150 independent components, two thousand independent components, or the like.

Figure 8:
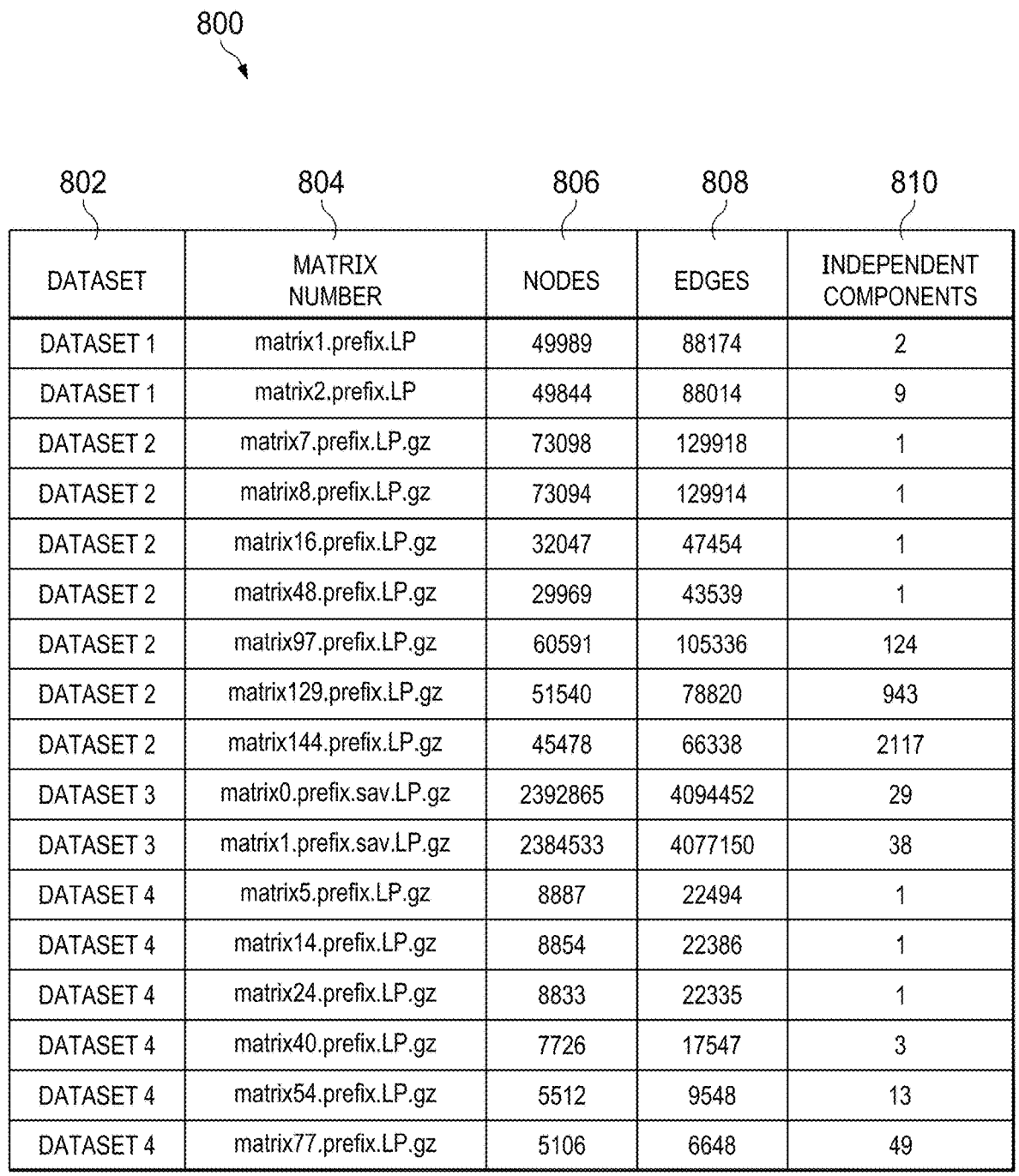
FIG. 8 illustrates a chart comprising results of the method of FIG. 5, according to an embodiment.

FIG. 8 illustrates chart 800 comprising results of method 500 of FIG. 5, according to an embodiment. Chart 800 shows results of four datasets 802. Each dataset is decomposed using variable-fixing decomposition method 500. As supply chain planner 110 models, decomposes, and solves the LP supply chain planning problem, the number of nodes 806 (i.e. the sum quantity of constraint nodes and variable nodes), edges 808 (links between constraint nodes and variable nodes), and independent components 810 are measured at various levels of the objective function hierarchy, represented on the chart by the "Matrix Number" 804.

As disclosed above, decomposition module 204 checks for decomposition boundaries prior to solving each objective. When an LP supply chain planning problem is sparse and decomposes into multiple independent problems, supply chain planner 110 solves the subproblems in parallel. For example, prior to solving the first dataset (Dataset 1) for a first objective function (Matrix 1) the variable-fixing decomposition method results in 49989 nodes connected by 88174 edges divided into two independent components. After solving for the first objective and fixing any variables based on the reduced cost calculation, supply chain planner 110 checks for decomposition of the subproblems. After variable fixing to upper and lower bounds, solver 206 decomposes the two independent components to nine independent components having 49844 nodes connected by 88014 edges. After solving for the second objective and fixing any variables based on the reduced cost calculation, supply chain planner 110 continues to check for decomposition at each subsequent iteration.

Like the first dataset (Dataset 1), some LP supply chain planning problems decompose quickly into many independent components when solved using method 500. Other datasets however may not decompose until the ninety-seventh objective, such as the second dataset (Dataset 2), or the fortieth objective, such as the fourth dataset (Dataset 4). The quantity of initial objectives that are solved prior to variable-fixing decomposition resulting in independent components does not necessarily indicate that the decomposition will continue to fail to decompose after subsequent solves. For example, although the second dataset (Dataset 2) did not decompose until the ninety-seventh objective, decomposition proceeded rapidly after that, such that the variable-fixing decomposition result of 124 independent components at the ninety-seventh objective resulted in 943 independent components at the one-hundred-and-twenty-ninth objective. After supply chain planner 110 uses the variable-fixing decomposition method to solve the one-hundred-and-forty-fourth objective, the number of independent components was 2,117. Similarly, the matrix of the fourth dataset (Dataset 4), for example, remains a monolithic LP supply chain planning problem until the fortieth objective, at which point the variable-fixing decomposition method results in three independent components. The matrices of the fourth dataset (Dataset 4) continue to decompose into thirteen independent components at the fifty-fourth objective, and forty-nine independent components at the seventy-seventh objective.

Although decomposition of various matrices is illustrated for LP supply chain planning problems having a particular number of nodes 806 and edges 808, embodiments of the disclosed variable fixing decomposition method 500 contemplate decomposing supply chain planning problems having any number of nodes 806 connected by any number of edges 808, according to particular needs.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of efficiently solving and improving computer solving speed of a decomposed supply chain planning problem modelled as a linear programming (LP) problem, comprising:
 a computer, comprising one or more graphical processing units and memory, the computer configured to:
  scan, by one or more sensors of one or more imaging devices, an identifier of one or more items to locate the one or more items in a supply chain network;
  receive a formulation of at least a portion of a multi-objective LP supply chain planning problem, the formulation comprising at least one variable fixed at an upper bound or a lower bound, the formulation further comprising the locations of the one or more items;
  solve the formulation for a higher-order objective;
  fix the upper bound or the lower bound of the at least one variable to preserve optimality of a solution of the formulation for the higher-order objective;
  when the upper bound of the at least one variable is fixed at the lower bound or the lower bound of the at least one variable is fixed at the upper bound, replace the at least one variable in the formulation with a value of the upper bound or the lower bound;
  check whether replacing the at least one variable with the value of the upper bound or the lower bound divides the formulation into at least two independent components;
  when replacing the at least one variable with the value of the upper bound or the lower bound divides the formulation into the at least two independent components, decompose the multi-objective LP supply chain planning problem into at least two subproblems representing the at least two independent components;
  instruct a robotic warehouse system to adjust inventory levels at one or more stocking points for the one or more items according to a solution to the multi-objective LP supply chain planning problem based on the at least two subproblems; and
  adjust, by the robotic warehouse system, the inventory levels at the one or more stocking points for the one or more items.

2. The system of claim 1, wherein the computer is further configured to:
 model the formulation as a constraint-variable graph comprising constraint nodes that represent constraints of the multi-objective LP supply chain planning problem, variable nodes that represent variables of the multi-objective LP supply chain planning problem, and edges coupling the constraint nodes to the variable nodes according to the relationship defined in the formulation; and
 check for decomposition of the multi-objective LP supply chain planning problem using the one or more graphical processing units to perform a network search to identify disconnected components comprising a first set of constraint and variable nodes that are disconnected from a second set of constraint and variable nodes.

3. The system of claim 2, wherein the network search is one or more of:
 Breadth-First Search (BFS);
 Depth-First Search (DFS); and
 a GPU-based network search.

4. The system of claim 1, wherein the computer is further configured to:
 solve the at least two subproblems for a lower-order objective, wherein the lower-order objective is a lower priority than the higher-order objective;
 fix the upper bound or the lower bound of at least one variable of the at least two subproblems;
 when the upper bound of the at least one subproblem variable is fixed at the lower bound or the lower bound of the at least one subproblem variable is fixed at the upper bound, replace the at least one subproblem variable with a value of the upper bound or the lower bound; and
 when replacing the at least one subproblem variable divides at least one subproblem of the at least two subproblems into at least two independent subcomponents, decompose the divisible subproblem into at least two smaller subproblems that represent the at least two independent subcomponents.

5. The system of claim 4, wherein the computer is configured to fix the upper bound or the lower bound of at least one variable of the at least two subproblems by:
 calculating a reduced cost for the at least one subproblem variable;
 when the reduced cost of the at least one subproblem variable is positive, fix the at least one subproblem variable at its lower bound; and
 when the reduced cost of the at least one subproblem variable is negative, fix the at least one subproblem variable at its upper bound.

6. The system of claim 1, wherein the formulation is a matrix formulation comprising a constraint-variable matrix.

7. The system of claim 6, wherein the computer is further configured to:
 search the matrix formulation for independent and disjoint subproblems;
 decompose the matrix formulation into at least two submatrices representing the independent and disjoint subproblems; and
 solve the submatrices in parallel to reduce the run time of the multi-objective LP supply chain planning solve.

8. A method of efficiently solving and improving computer solving speed of a decomposed supply chain planning problem modelled as a linear programming (LP) problem, comprising:
 scanning, by one or more sensors of one or more imaging devices, an identifier of one or more items to locate the one or more items in a supply chain network;
 receiving, by a computer comprising one or more graphical processing units and a memory, a formulation of at least a portion of a multi-objective LP supply chain planning problem, the formulation comprising at least one variable fixed at an upper bound or a lower bound, the formulation further comprising the locations of the one or more items;
 solving the formulation for a higher-order objective;
 fixing the upper bound or the lower bound of the at least one variable to preserve optimality of a solution of the formulation for the higher-order objective;

when the upper bound of the at least one variable is fixed at the lower bound or the lower bound of the at least one variable is fixed at the upper bound, replacing the at least one variable in the formulation with a value of the upper bound or the lower bound;

checking whether replacing the at least one variable with the value of the upper bound or the lower bound divides the formulation into at least two independent components;

when replacing the at least one variable with the value of the upper bound or the lower bound divides the formulation into the at least two independent components, decomposing the multi-objective LP supply chain planning problem into at least two subproblems representing the at least two independent components;

instructing a robotic warehouse system to adjust inventory levels at one or more stocking points for the one or more items according to a solution to the multi-objective LP supply chain planning problem based on the at least two subproblems; and adjusting, by the robotic warehouse system, the inventory levels at the one or more stocking points for the one or more items.

9. The method of claim 8, further comprising:

modeling the formulation as a constraint-variable graph comprising constraint nodes that represent constraints of the multi-objective LP supply chain planning problem, variable nodes that represent variables of the multi-objective LP supply chain planning problem, and edges coupling the constraint nodes to the variable nodes according to the relationship defined in the formulation; and checking for decomposition of the multi-objective LP supply chain planning problem using the one or more graphical processing units to perform a network search to identify disconnected components comprising a first set of constraint and variable nodes that are disconnected from a second set of constraint and variable nodes.

10. The method of claim 9, wherein the network search is one or more of:

Breadth-First Search (BFS);

Depth-First Search (DFS); and a GPU-based network search.

11. The method of claim 8, further comprising:

solving the at least two subproblems for a lower-order objective, wherein the lower-order objective is a lower priority than the higher-order objective;

fixing the upper bound or the lower bound of at least one variable of the at least two subproblems;

when the upper bound of the at least one subproblem variable is fixed at the lower bound or the lower bound of the at least one subproblem variable is fixed at the upper bound, replacing the at least one subproblem variable with a value of the upper bound or the lower bound; and when replacing the at least one subproblem variable divides at least one subproblem of the at least two subproblems into at least two independent subcomponents, decomposing the divisible subproblem into at least two smaller subproblems that represent the at least two independent subcomponents.

12. The method of claim 11, wherein fixing the upper bound or the lower bound of at least one variable of the at least two subproblems by:

calculating a reduced cost for the at least one subproblem variable;

when the reduced cost of the at least one subproblem variable is positive, fixing the at least one subproblem variable at its lower bound; and when the reduced cost of the at least one subproblem variable is negative, fixing the at least one subproblem variable at its upper bound.

13. The method of claim 8, wherein the formulation is a matrix formulation comprising a constraint-variable matrix.

14. The method of claim 13, further comprising:

searching the matrix formulation for independent and disjoint subproblems;

decomposing the matrix formulation into at least two submatrices representing the independent and disjoint subproblems; and solving the submatrices in parallel to reduce the run time of the multi-objective LP supply chain planning solve.

15. A non-transitory computer-readable medium comprising software for efficiently solving and improving computer solving speed of a decomposed supply chain planning problem modelled as a linear programming (LP) problem, the software when executed by one or more graphical processing units, is configured to:

scan, by one or more sensors of one or more imaging devices, an identifier of one or more items to locate the one or more items in a supply chain network;

receive a formulation of at least a portion of a multi-objective LP supply chain planning problem, the formulation comprising at least one variable fixed at an upper bound or a lower bound, the formulation further comprising the locations of the one or more items;

solve the formulation for a higher-order objective;

fix the upper bound or the lower bound of the at least one variable to preserve optimality of a solution of the formulation for the higher-order objective;

when the upper bound of the at least one variable is fixed at the lower bound or the lower bound of the at least one variable is fixed at the upper bound, replace the at least one variable in the formulation with a value of the upper bound or the lower bound;

check whether replacing the at least one variable with the value of the upper bound or the lower bound divides the formulation into at least two independent components;

when replacing the at least one variable with the value of the upper bound or the lower bound divides the formulation into the at least two independent components, decompose the multi-objective LP supply chain planning problem into at least two subproblems representing the at least two independent components;

instruct a robotic warehouse system to adjust inventory levels at one or more stocking points for the one or more items according to a solution to the multi-objective LP supply chain planning problem based on the at least two subproblems; and adjust, by the robotic warehouse system, the inventory levels at the one or more stocking points for the one or more items.

16. The non-transitory computer-readable medium of claim 15, wherein the software is further configured to:

model the formulation as a constraint-variable graph comprising constraint nodes that represent constraints of the multi-objective LP supply chain planning problem, variable nodes that represent variables of the multi-objective LP supply chain planning problem, and edges coupling the constraint nodes to the variable nodes according to the relationship defined in the formulation; and check for decomposition of the multi-objective LP supply chain planning problem using the one or more graphical processing units to perform a network search to identify disconnected components comprising a first set of constraint and variable nodes that are disconnected from a second set of constraint and variable nodes.

17. The non-transitory computer-readable medium of claim 15, wherein the software is further configured to:
solve the at least two subproblems for a lower-order objective, wherein the lower-order objective is a lower priority than the higher-order objective;
fix the upper bound or the lower bound of at least one variable of the at least two subproblems;
when the upper bound of the at least one subproblem variable is fixed at the lower bound or the lower bound of the at least one subproblem variable is fixed at the upper bound, replace the at least one subproblem variable with a value of the upper bound or the lower bound; and
when replacing the at least one subproblem variable divides at least one subproblem of the at least two subproblems into at least two independent subcomponents, decompose the divisible subproblem into at least two smaller subproblems that represent the at least two independent subcomponents.

18. The non-transitory computer-readable medium of claim 17, wherein the software is configured to fix the upper bound or the lower bound of at least one variable of the at least two subproblems by:
calculating a reduced cost for the at least one subproblem variable;
when the reduced cost of the at least one subproblem variable is positive, fix the at least one subproblem variable at its lower bound; and
when the reduced cost of the at least one subproblem variable is negative, fix the at least one subproblem variable at its upper bound.

19. The non-transitory computer-readable medium of claim 15, wherein the formulation is a matrix formulation comprising a constraint-variable matrix.

20. The non-transitory computer-readable medium of claim 19, wherein the software is further configured to:
search the matrix formulation for independent and disjoint subproblems;
decompose the matrix formulation into at least two submatrices representing the independent and disjoint subproblems; and
solve the submatrices in parallel to reduce the run time of the multi-objective LP supply chain planning solve.

* * * * *